United States Patent
Tora et al.

(10) Patent No.: US 11,757,708 B2
(45) Date of Patent: Sep. 12, 2023

(54) ANOMALY DETECTION DEVICE, ANOMALY DETECTION METHOD, AND ANOMALY DETECTION PROGRAM

(71) Applicant: NIPPON TELEGRAPH AND TELEPHONE CORPORATION, Tokyo (JP)

(72) Inventors: Shotaro Tora, Tokyo (JP); Masashi Toyama, Tokyo (JP); Machiko Toyoda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/433,425

(22) PCT Filed: Feb. 7, 2020

(86) PCT No.: PCT/JP2020/004969
§ 371 (c)(1),
(2) Date: Aug. 24, 2021

(87) PCT Pub. No.: WO2020/175113
PCT Pub. Date: Sep. 3, 2020

(65) Prior Publication Data
US 2022/0123988 A1    Apr. 21, 2022

(30) Foreign Application Priority Data
Feb. 26, 2019   (JP) ................................. 2019-033254

(51) Int. Cl.
*H04L 41/069*   (2022.01)
*G06F 11/07*    (2006.01)
*H04L 41/0604*  (2022.01)

(52) U.S. Cl.
CPC ........ *H04L 41/069* (2013.01); *G06F 11/0775* (2013.01); *H04L 41/0609* (2013.01)

(58) Field of Classification Search
CPC ............... H04L 41/069; H04L 41/0609; H04L 41/0677; G06F 11/0775; G06F 11/07666;
(Continued)

(56) References Cited

U.S. PATENT DOCUMENTS 8,332,503 B2 * 12/2012 Takagi ................... H04L 43/00
                                                  709/224
10,963,333 B1 *  3/2021 Nijim .................. G06F 11/3006
(Continued)

FOREIGN PATENT DOCUMENTS

| JP | 2014153723 A  | 8/2014 |
| JP | 201536891 A   | 2/2015 |
| WO | 2017081865 A1 | 5/2017 |

OTHER PUBLICATIONS

Takada et al. (2000) "MieLog : Log Information Browser with Information Visualization and Text Mining" Information Processing Society of Japan Journal, vol. 41, No. 12, pp. 3265-3275.

*Primary Examiner* — Hitesh Patel
*Assistant Examiner* — Vinh Nguyen

(57) ABSTRACT

An anomaly detection apparatus (10) includes a storage unit (14) that stores dictionary information (14b) in which a partial character string of a message representing a type of a message included in a text log output from a system and an ID set for the type of the message are associated with each other. The anomaly detection apparatus (10), when the message included in the text log output from the system is acquired, refers to the dictionary information (14b) stored in the storage unit (14), classifies the message included in the
(Continued)

text log by the type, and assigns the ID to the message that has been classified; and detects an anomaly based on the ID assigned to the message.

18 Claims, 12 Drawing Sheets

(58) Field of Classification Search
CPC ............... G06F 2201/88; G06F 11/076; G06F 11/3006; G06F 11/3082; G06F 11/3476; G06F 13/00; G06F 16/00; G06F 16/30
See application file for complete search history.

(56) References Cited

U.S. PATENT DOCUMENTS

| | | | | |
|---|---|---|---|---|
| 2012/0166879 | A1* | 6/2012 | Watanabe | G06F 11/0751 714/37 |
| 2012/0210176 | A1* | 8/2012 | Suzuki | G06F 11/0784 714/48 |
| 2013/0238319 | A1* | 9/2013 | Minegishi | G06F 40/20 704/9 |
| 2014/0143625 | A1* | 5/2014 | Watanabe | G06F 11/008 714/741 |
| 2016/0344583 | A1* | 11/2016 | Contreras | H04L 43/16 |
| 2016/0371489 | A1* | 12/2016 | Puri | G06F 16/254 |
| 2017/0123955 | A1* | 5/2017 | Hayashi | G06F 11/3055 |
| 2017/0250883 | A1* | 8/2017 | Sawada | H04L 43/0847 |
| 2018/0046529 | A1* | 2/2018 | Togawa | G06F 11/0787 |
| 2018/0165147 | A1* | 6/2018 | Debnath | G06F 11/0766 |
| 2018/0203757 | A1* | 7/2018 | Akune | G06F 11/0784 |
| 2018/0219723 | A1* | 8/2018 | Scarpelli | G06F 21/552 |
| 2018/0357214 | A1* | 12/2018 | Ajiro | G06K 9/00523 |
| 2019/0236160 | A1* | 8/2019 | Wang | G06F 16/358 |
| 2020/0133823 | A1* | 4/2020 | Kumar | G06F 11/006 |

* cited by examiner

2015/05/18T14:56 LINK-UP Interface 1/0/17
2015/05/18T14:58 LINK-UP Interface 0/0/0
2015/05/18T14:59 LINK-UP Gigabitethernet 0/2/5
        ......
2015/05/18T15:01 LINK-UP Gigabitethernet 0/0/0

Fig. 2

| ID | WORD SEQUENCE |
|----|---------------|
| 1  | LINK-UP Interface * |
| 2  | LINK-UP Gigabitethernet * |
|    |               |

Fig. 3

ANOMALY DETECTION DEVICE, ANOMALY DETECTION METHOD, AND ANOMALY DETECTION PROGRAM

CROSS-REFERENCE TO RELATED APPLICATIONS

This application is a U.S. 371 Application of International Patent Application No. PCT/JP2020/004969, filed on 7 Feb. 2020, which application claims priority to and the benefit of JP Application No. 2019-033254, filed on 26 Feb. 2019, the disclosures of which are hereby incorporated herein by reference in their entireties.

TECHNICAL FIELD

The present disclosure relates to an anomaly detection apparatus, an anomaly detection method, and an anomaly detection program.

BACKGROUND ART

In the related art, system monitoring using a text log such as a syslog or management information base (MIB) information has been performed for anomaly detection and state analysis in server systems and network systems.

For example, when a failure occurs in a system, a text log is manually searched for with a specific keyword, and a message containing the keyword is extracted as a critical message.

CITATION LIST

Patent Literature

Patent Literature 1: JP 2014-153723 A
Patent Literature 2: JP 2015-36891 A

SUMMARY OF THE INVENTION

Technical Problem

However, in blacklist monitoring in the related art, there is a problem in that, even though known anomalies can be detected, unknown anomalies cannot be detected.

Means for Solving the Problem

From the viewpoint of solving the problem described above and achieving this object, according to the present disclosure, there is provided an anomaly detection apparatus including a storage unit configured to store dictionary information in which a partial character string of a message representing a type of a message included in a text log output from a system and an ID set for the type of the message are associated with each other, a classification unit configured to, when the message included in the text log output from the system is acquired, refer to the dictionary information stored in the storage unit, classify the message included in the text log by the type, and assign the ID to the message that has been classified, and a detection unit configured to detect an anomaly based on the ID assigned to the message by the classification unit.

Further, according to the present disclosure, there is provided an anomaly detection method executed by an anomaly detection apparatus including a storage unit configured to store dictionary information in which a partial character string of a message representing a type of a message included in a text log output from a system and an ID set for the type of the message are associated with each other. The anomaly detection method includes, when the message included in the text log output from the system is acquired, referring to the dictionary information stored in the storage unit, classifying the message included in the text log by the type, and assigning the ID to the message that has been classified; and detecting an anomaly based on the ID assigned to the message by the classifying.

Further, according to the present disclosure, there is provided an anomaly detection program for causing a computer to execute, when a message included in a text log output from a system is acquired, referring to dictionary information stored in a storage unit configured to store the dictionary information in which a partial character string of a message representing a type of the message included in the text log output from the system and an ID set for the type of the message are associated with each other, classifying the message included in the text log by the type, and assigning an ID to the classified message; and detecting an anomaly based on the ID assigned to the message by the classifying.

Effects of the Invention

According to the present disclosure, an effect capable of detecting an unknown anomaly is achieved.

BRIEF DESCRIPTION OF DRAWINGS

FIG. 2 is a diagram illustrating an example of a text log.
FIG. 3 is a diagram illustrating an example of a data configuration of dictionary information.

DESCRIPTION OF EMBODIMENTS

Hereinafter, embodiments of an anomaly detection apparatus, an anomaly detection method, and an anomaly detection program according to the present application will be described in detail with reference to the drawings. Note that the embodiments by no means limit the anomaly detection apparatus, the anomaly detection method, and the anomaly detection program according to the present application.

First Embodiment

In the following embodiment, a configuration of an anomaly detection apparatus 10 according to a first embodiment and a flow of processing of the anomaly detection apparatus 10 will be sequentially described, and effects of the first embodiment will be described at the end.

Figure 1:
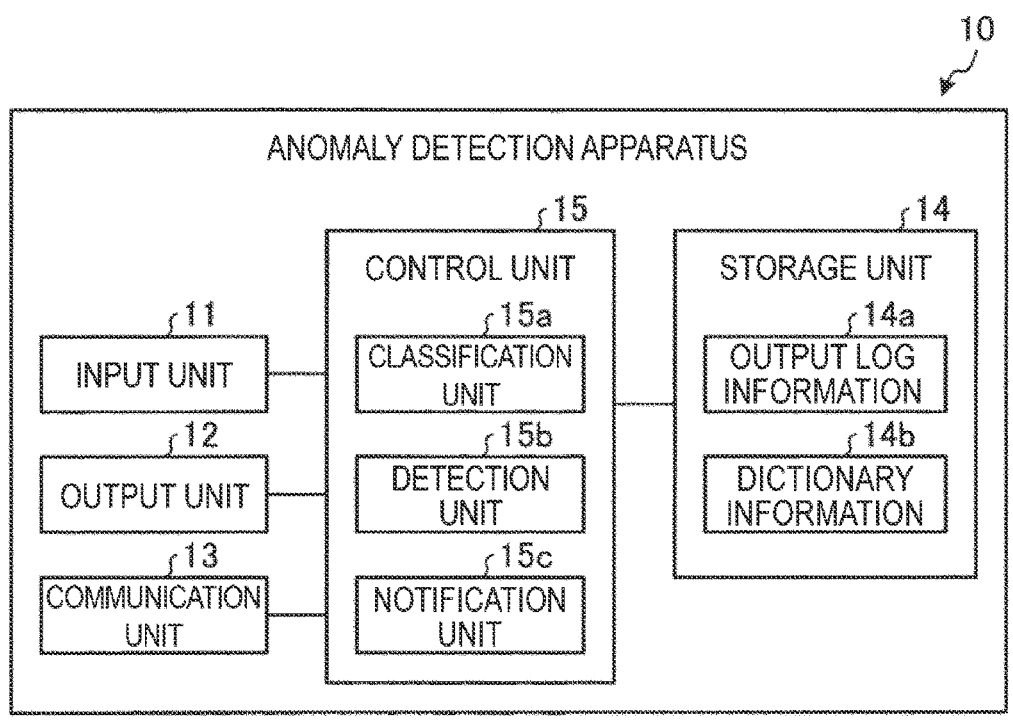
FIG. 1 is a block diagram illustrating a configuration example of an anomaly detection apparatus according to a first embodiment.

Configuration of Anomaly Detection Apparatus First, a configuration example of the anomaly detection apparatus 10 according to the present embodiment will be described with reference to FIG. 1. FIG. 1 is a block diagram illustrating a configuration example of an anomaly detection apparatus according to a first embodiment. As illustrated in FIG. 1, the anomaly detection apparatus 10 includes an input unit 11, an output unit 12, a communication unit 13, a storage unit 14, and a control unit 15.

The input unit 11 receives input of data from a user. The input unit 11 is, for example, an input device such as a mouse or a keyboard. The output unit 12 outputs data by displaying a screen or the like. The output unit 12 is, for example, a display device such as a display. The communication unit 13 performs data communication with other apparatuses via a network. For example, the communication unit 13 is a network interface card (NIC).

The storage unit 14 is a storage device such as a hard disk drive (HDD), a solid state drive (SSD), or an optical disc. The storage unit 14 may be a data rewritable semiconductor memory such as a random access memory (RAM), a flash memory, or a non volatile static random access memory (NVSRAM). The storage unit 14 stores an operating system (OS) and various programs that are executed in the anomaly detection apparatus 10. Further, the storage unit 14 stores various information used for execution of programs.

The storage unit 14 stores output log information 141 and dictionary information 142. The storage unit 14 stores the dictionary information 142 in which a partial character string of a message representing a type of each of a plurality of messages included in a text log output from a system and an ID set for each type of the messages are associated with each other.

The storage unit 14 stores the text log output from the system as output log information 14a. Here, the text log is output from, for example, a server machine, a personal computer, a storage, or the like that constitutes a computing system. Further, the text log is output from, for example, a router, a firewall, a load balancer, an optical transmission device, an optical transmission repeater, and the like that constitute a network system. Further, the output text log may be related to the entire system, or may be related to the devices that constitute the system. Further, the text log may be output in an environment in which a computing system or a network system is virtualized.

The text log is, for example, an OS syslog, an application and database execution log, an error log, an operating log, MIB information obtained from a network device, a monitoring system alert, a behavior log, an operating state log, or the like. Note that the text log is not limited to those described above, and may be of any type.

FIG. 2 is a diagram illustrating an example of a text log. As illustrated in FIG. 2, each record of the text log includes a message and an occurrence date and time attached to the message. For example, a record on the first line of the text log includes the message "LINK-UP Interface 1/0/17" and the occurrence date and time "2015/05/18 T14:56". Note that the message may include additional information such as a host or log level.

The storage unit 14 stores data for classifying messages of the text log as dictionary information 14b. FIG. 3 is a diagram illustrating an example of a data configuration of dictionary information. As illustrated in FIG. 3, the dictionary information 14b includes a template composed of an ID and a word sequence. That is, the template is composed of a template ID and a word sequence. The ID is information for identifying a type by which a message of a text log is to be classified. The word sequence is a character string used to classify messages of a text log. For example, whether the message is classified into a type where the ID is "1" is determined using the word sequence "LINK-UP Interface*". The classification of the message using the dictionary information 14b is performed by a classification unit 15a. The specific processing of the classification unit 15a will be described later.

The control unit 15 controls the entirety of the anomaly detection apparatus 10. The control unit 15 is, for example, an electronic circuit such as a central processing unit (CPU) or a micro processing unit (MPU), or an integrated circuit such as an application specific integrated circuit (ASIC) or a field programmable gate array (FPGA). Further, the control unit 15 includes an internal memory for storing programs or control data that define various processing procedures, and executes each processing operation using the internal memory. In addition, the control unit 15 functions as various processing units by the operation of various programs. For example, the control unit 15 includes the classification unit 15a, a detection unit 15b, and a notification unit 15c.

When the messages included in the text log output from the system are acquired, the classification unit 15a refers to dictionary information stored in the storage unit 14, classifies the messages included in the text log by type, and assigns an ID to each of the classified messages. As described above, the classification unit 15a performs classification using the dictionary information 14b.

Figure 4:
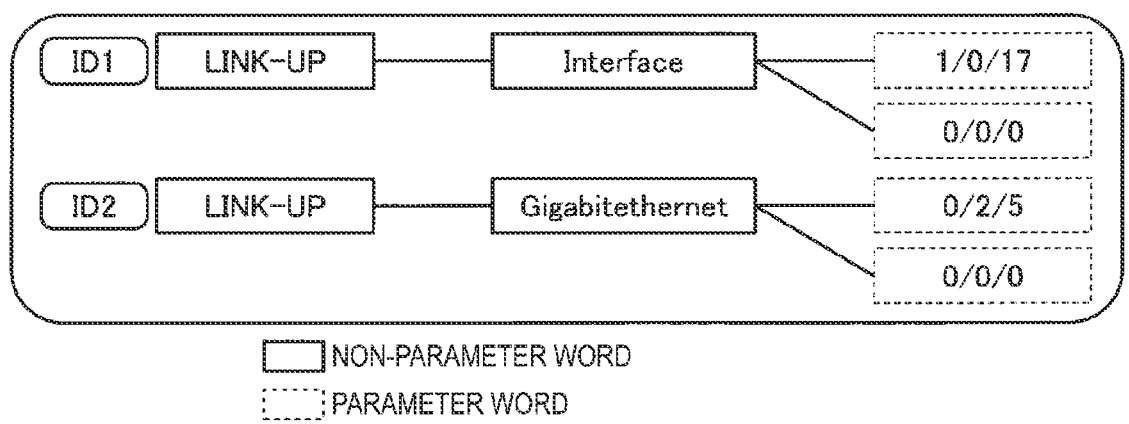
FIG. 4 is a diagram illustrating creation of a template.

Here, the dictionary information 14b may be created by the classification unit 15a. For example, the classification unit 15a can create a template based on a character string obtained by deleting a parameter from the message. Here, a method of creating a template based on a text log will be described with reference to FIG. 4. FIG. 4 is a diagram illustrating creation of a template. The template is composed of a template ID and a word sequence.

The classification unit 15a divides the message by a predetermined delimiter to extract a group of words, and classifies each word into a parameter or a non-parameter according to a character type. Further, the classification unit 15a compares each word sequence of a group of templates in the dictionary information stored in the storage unit 14 with each of the classified words, and when there is a template for which the word sequence matches all the words in a portion classified as non-parameter in the message, the classification unit 15a assigns the ID of the template to the message.

In addition, when classifying a message, in the case where a template having a word sequence that matches all the words in the portion classified as non-parameter is not present in the group of templates in the dictionary information stored in the storage unit 14, the classification unit 15a may create a new template having the word sequence based on the message and generate a new template with a new ID.

As illustrated in FIG. 4, the classification unit 15a can consider, for example, a word composed of "numerical values and symbols" as a parameter, and can use a character string in which the parameter is deleted from the message as a word sequence. In this case, the classification unit 15a creates a word sequence of "LINK-UP Interface" from the message "LINK-UP Interface 1/0/17" or the message "LINK-UP Interface 0/0/0" included in the text log of FIG. 2. Further, the classification unit 15a generates a template having the created word sequence and a new ID and adds the template to the dictionary information 14b of the storage unit 14. At this time, the classification unit 15a may add a wild card such as "*" to the portion where the parameter has been deleted.

Note that the word considered by the classification unit 15a as a parameter is not limited to the example described above. For example, the classification unit 15a may consider all "words including numbers" as a parameter, consider "words composed of numbers and alphabet characters" as a non-parameter, or consider only "words composed of only alphabet characters" as a non-parameter.

Further, the parameter/non-parameter determination criterion is not limited to character type, and may be created on a rule basis. Specifically, the classification unit 15a may consider a "word following an IP address rule" as a parameter. Further, the classification unit 15a may determine, beyond the frame of the word, a parameter/non-parameter for a character string including the "predetermined delimiter".

Further, in the present embodiment, the template of the dictionary information 14b need not be created by the classification unit 15a, and may be created by a user in advance or automatically created by an apparatus other than the anomaly detection apparatus 10.

Figure 5:
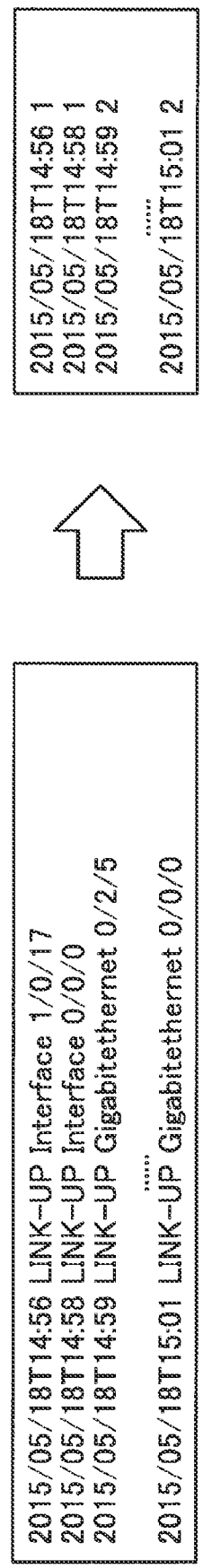
FIG. 5 is a diagram illustrating an ID assignment process.

Here, an ID assignment process by the classification unit 15a will be described with reference to FIG. 5. FIG. 5 is a diagram illustrating an ID assignment process. The classification unit 15a, by comparing the word sequence of each template in the dictionary information 14b with a message of a text log, classifies the message. At this time, the classification unit 15a determines that a template matches the message when the word sequence of the template completely matches or partially matches the message. Then, the classification unit 15a assigns, to the message, the ID of the template determined to match the message.

For example, the word sequence "LINK-UP Interface*" of the template with an ID of "1" in FIG. 3 partially matches the message "LINK-UP Interface 1/0/17" on the first line of the text log in FIG. 2. Thus, the classification unit 15a determines that the word sequence "LINK-UP Interface*" of the template matches the message "LINK-UP Interface 1/0/17", and assigns the ID "1" to the message "LINK-UP Interface 1/0/17".

Further, when a template having the word sequence that matches the message is not present in the dictionary information 14b, the classification unit 15a assigns a new ID that has not yet been assigned, and adds a new template to the dictionary information 14b based on the message.

The classification unit 15a performs the classification of the message and the assignment of the ID to create a classified text log. As illustrated in FIG. 2, each record of the classified text log includes the ID and the occurrence date and time of the message. For example, a record on the first line of the classified text log includes the ID "1" assigned to the message "LINK-UP Interface 1/0/17" and the occurrence date and time "2015/05/18 T14:56".

Figure 6:
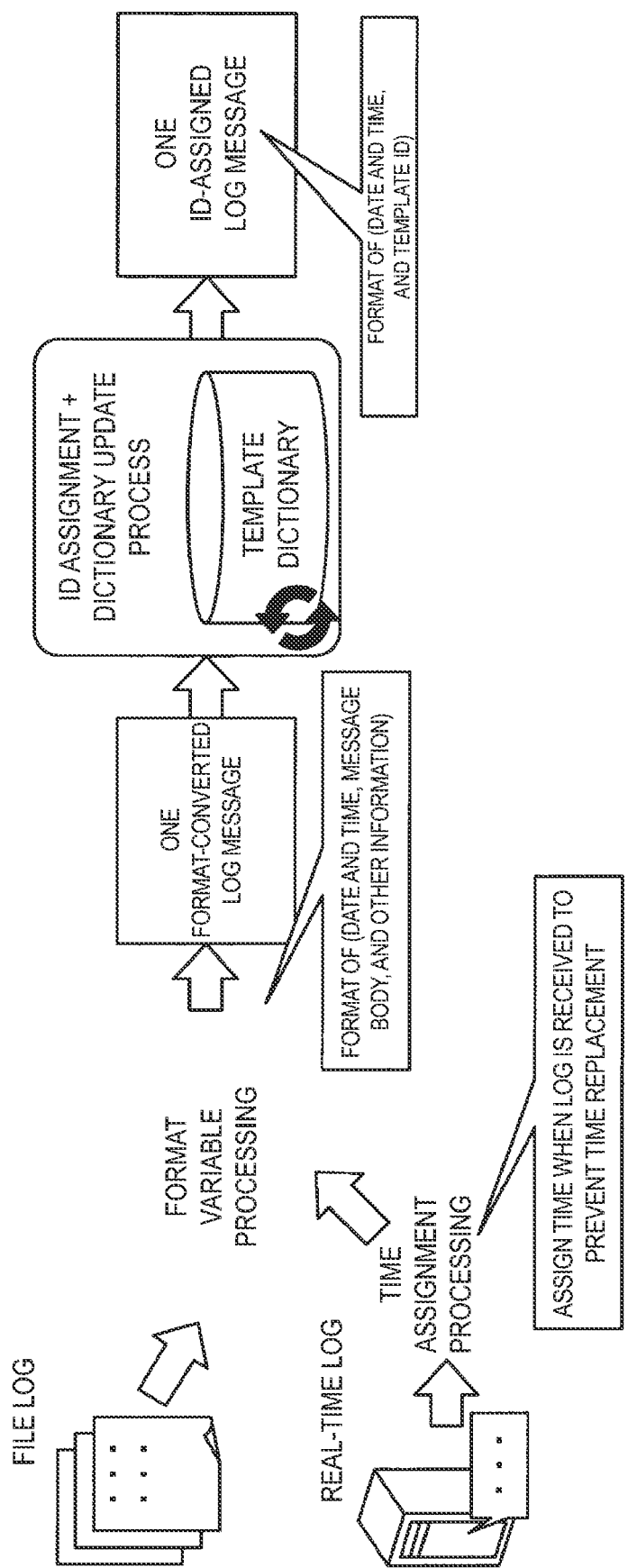
FIG. 6 is a diagram illustrating an example of a series of flows for aggregating logs and assigning an ID.

Next, an example of a series of processes for aggregating logs and assigning an ID will be described with reference to FIG. 6. FIG. 6 is a diagram illustrating an example of a series of flows for aggregating logs and assigning an ID. As illustrated in FIG. 6, the classification unit 15a performs format-conversion of various logs having different formats such as a file log or a real-time log according to the respective formats. Here, for example, the classification unit 15a converts the format after assigning the time when the log was received to prevent time replacement for the real-time log. It is assumed that the format-converted log message includes the date and time, the message body, and other information.

Then, the classification unit 15a refers to the template of the dictionary information to assign an ID to the message, and outputs an ID-assigned log message. Further, when a new ID is assigned, the classification unit 15a updates the dictionary information to add a new template.

Returning to the description in FIG. 1, the detection unit 15b detects an anomaly based on the ID assigned to the message by the classification unit 15a. For example, the detection unit 15b detects an anomaly when, among a plurality of the messages classified by the classification unit 15a, the number of types of messages for which a corresponding type of message does not exist in the dictionary information of the storage unit 14 exceeds a predetermined threshold.

Figure 7:
FIG. 7 is a diagram illustrating changes in the number of new templates when a system is operated stably.
Figure 8:
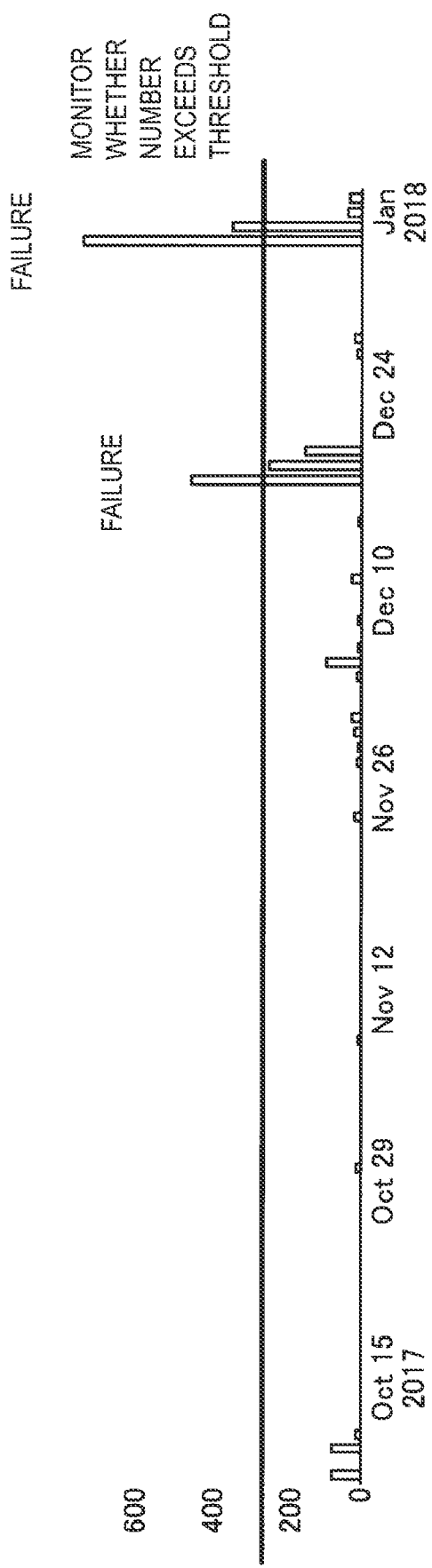
FIG. 8 is a diagram illustrating changes in the number of new templates when an unknown event occurs.

Here, changes in the number of new templates will be described with reference to FIGS. 7 and 8. FIG. 7 is a diagram illustrating changes in the number of new templates when a system is operated stably. FIG. 8 is a diagram illustrating changes in the number of new templates when an unknown event occurs. As illustrated in FIG. 7, if the system is operated stably, unknown logs appear for a certain period of time in an initial stage, but the frequency of appearance of the unknown logs decreases. Then, as illustrated in FIG. 8, when an unknown event such as a failure or maintenance occurs in the system, a large amount of unknown logs appear in a predetermined period of time.

To detect the occurrence of such an unknown event, the detection unit 15b determines whether the number of new IDs assigned in a predetermined period of time exceeds a predetermined threshold. For example, in the example in FIG. 8, the detection unit 15b counts the number of new IDs assigned per day, and monitors whether the number of new IDs assigned per day exceeds the threshold 250. Then, the detection unit 15b detects an anomaly when the number of new IDs assigned per day exceeds the threshold "250". Note that the setting of the threshold can be freely changed.

Returning to the description in FIG. 1, the notification unit 15c gives a notification of information regarding the message including the ID assigned by the classification unit 15a. For example, the notification unit 15c may notify an external terminal device of a new ID list. Further, for example, when anomalies are detected by the detection unit 15b, for example, the notification unit 15c may notify an external terminal device of an alert. Further, for example, the notification unit 15c may display dictionary information and a heat map of IDs in response to a request from an external terminal device.

Figure 9:
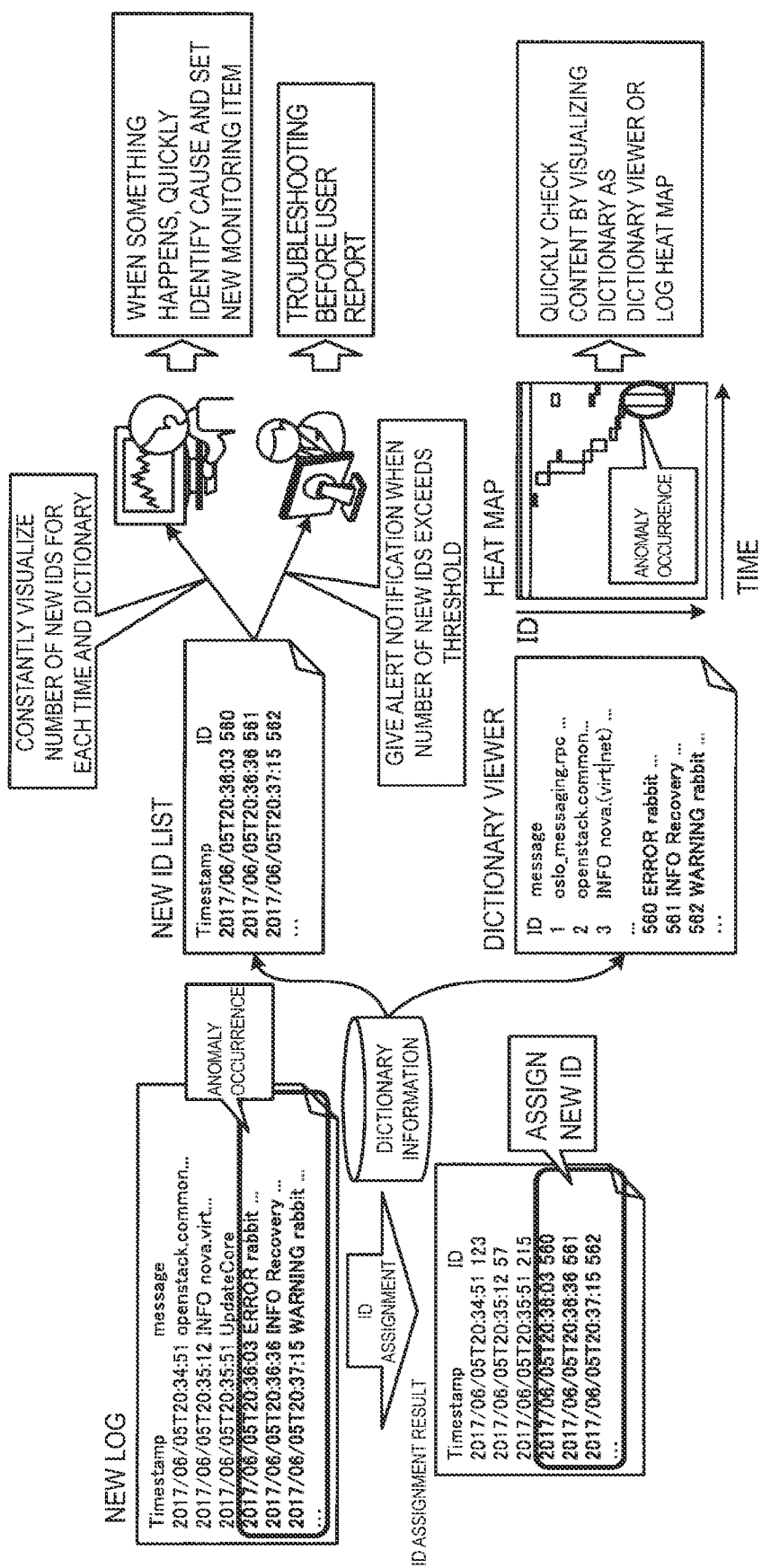
FIG. 9 is a diagram illustrating a series of flows of processing for finding an unknown anomaly by monitoring the number of new templates per unit time.

Here, a series of flows of processing for finding an unknown anomaly by monitoring the number of new IDs assigned per unit time will be described with reference to FIG. 9. FIG. 9 is a diagram illustrating a series of flows of processing for finding an unknown anomaly by monitoring the number of new IDs assigned per unit time. As illustrated in FIG. 9, for a new log output from a system in which an anomaly has occurred, the anomaly detection apparatus 10 refers to the dictionary information 14b stored in the storage unit 14, and assigns a new ID to the message of the text log that is not registered in the dictionary information. Then, the anomaly detection apparatus 10 notifies an external terminal device of a new ID list.

Further, in the anomaly detection apparatus 10, it is possible to constantly visualize the number of new IDs for each time and the dictionary, and thereby, when something happens, the cause can be quickly identified and anew monitoring item can be set. In addition, the anomaly detection apparatus 10 notifies the external terminal device of an alert when the number of new IDs in a predetermined period of time exceeds a predetermined threshold. In this way, in the anomaly detection apparatus 10, an unknown anomaly can be found early by monitoring the number of new IDs assigned per unit time, and it is possible to perform troubleshooting before the user report.

In other words, assuming that a log at a normal time is registered in the dictionary information 14b and a new ID is assigned to a log at the time of occurrence of an anomaly, the anomaly detection apparatus 10 assigns a new ID to a log that is not in the dictionary information and can detect an unknown anomaly from the increasing number of new IDs.

Further, in the anomaly detection apparatus 10, a dictionary viewer or a heat map of IDs may be displayed in response to a request from the terminal device. It is possible to quickly check the content by visualizing the dictionary as a dictionary viewer or a log heat map of the number of new IDs for each time.

Further, in the above description, a case has been described in which the detection unit 15b of the anomaly detection apparatus 10 detects an anomaly when the number of new IDs in a predetermined period of time exceeds a predetermined threshold, but the present disclosure is not limited thereto. For example, the detection unit 15b may be described as follows. The detection unit 15b aggregates, for each ID, the number of times the ID is assigned to a message per unit time (for example, one day) from the result of the classification of the message by the classification unit 15a. Then, the detection unit 15b may compare the number of times the ID is assigned per any unit time with the number of times the ID is assigned per another unit time, and detect a level of anomaly for each ID per each unit time.

Figure 10:
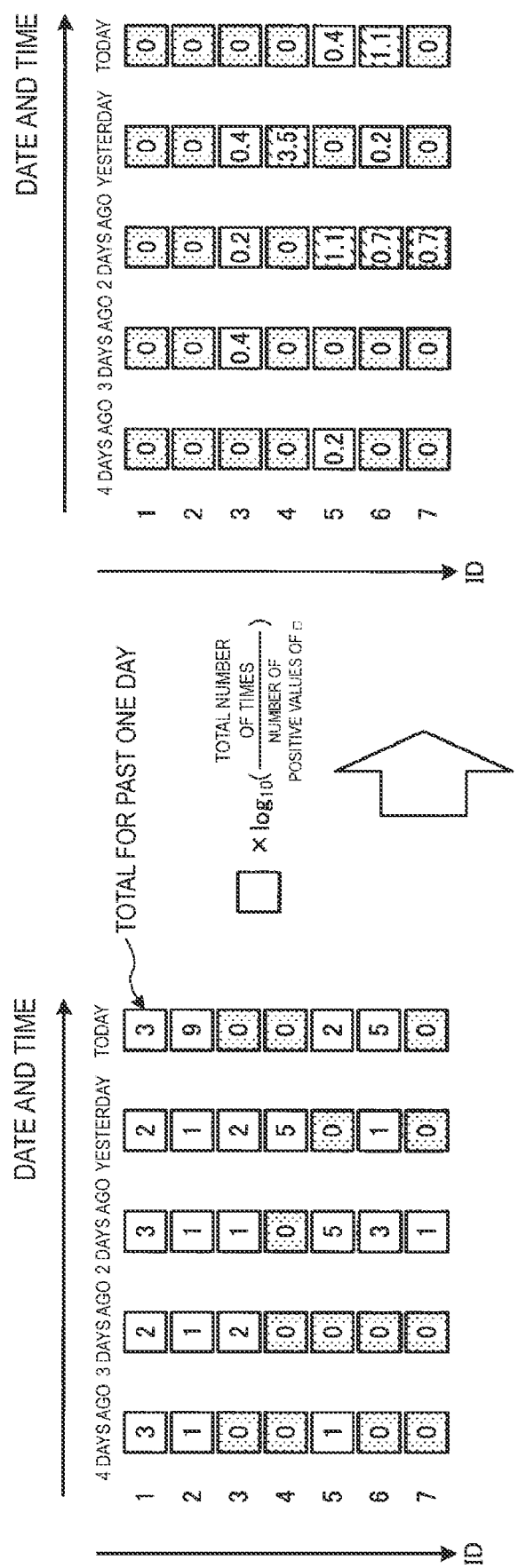
FIG. 10 is a diagram illustrating processing for calculating a level of anomaly from the relative change in the frequency of appearance of each ID.

Here, a process for calculating the level of anomaly from a relative change in the frequency of appearance of each ID will be described with reference to FIG. 10. FIG. 10 is a diagram illustrating a process of calculating the level of anomaly from a relative change in the frequency of appearance of each ID. For example, when the detection unit 15b, on a daily basis, calculates an aggregate value per day for the past five days, and calculates a term frequency-inverse document frequency (TF-IDF) value, it is possible to find an ID that has a high frequency on any given day for the last five days. On the left side of FIG. 10, the total number of times an ID is assigned per day in 5 days (4 days ago, 3 days ago, 2 days ago, yesterday, today) is displayed for each of the IDs of "1" to "7".

For example, the detection unit 15b uses the expression illustrated in FIG. 10 to calculate the TF-IDF value for each ID per day. Referring to a specific example, the detection unit 15b calculates "5×log$_{10}$ (5/1)" for "yesterday" for the ID "4", and approximately "3.5" is obtained for the TF-IDF value.

Then, the detection unit 15b uses the calculated TF-IDF value as the level of anomaly, and when there is an ID whose level of anomaly is equal to or higher than a predetermined threshold (for example, 0.7), the detection unit 15b may detect an anomaly.

Processing Procedure of Anomaly Detection Apparatus

Figure 11:
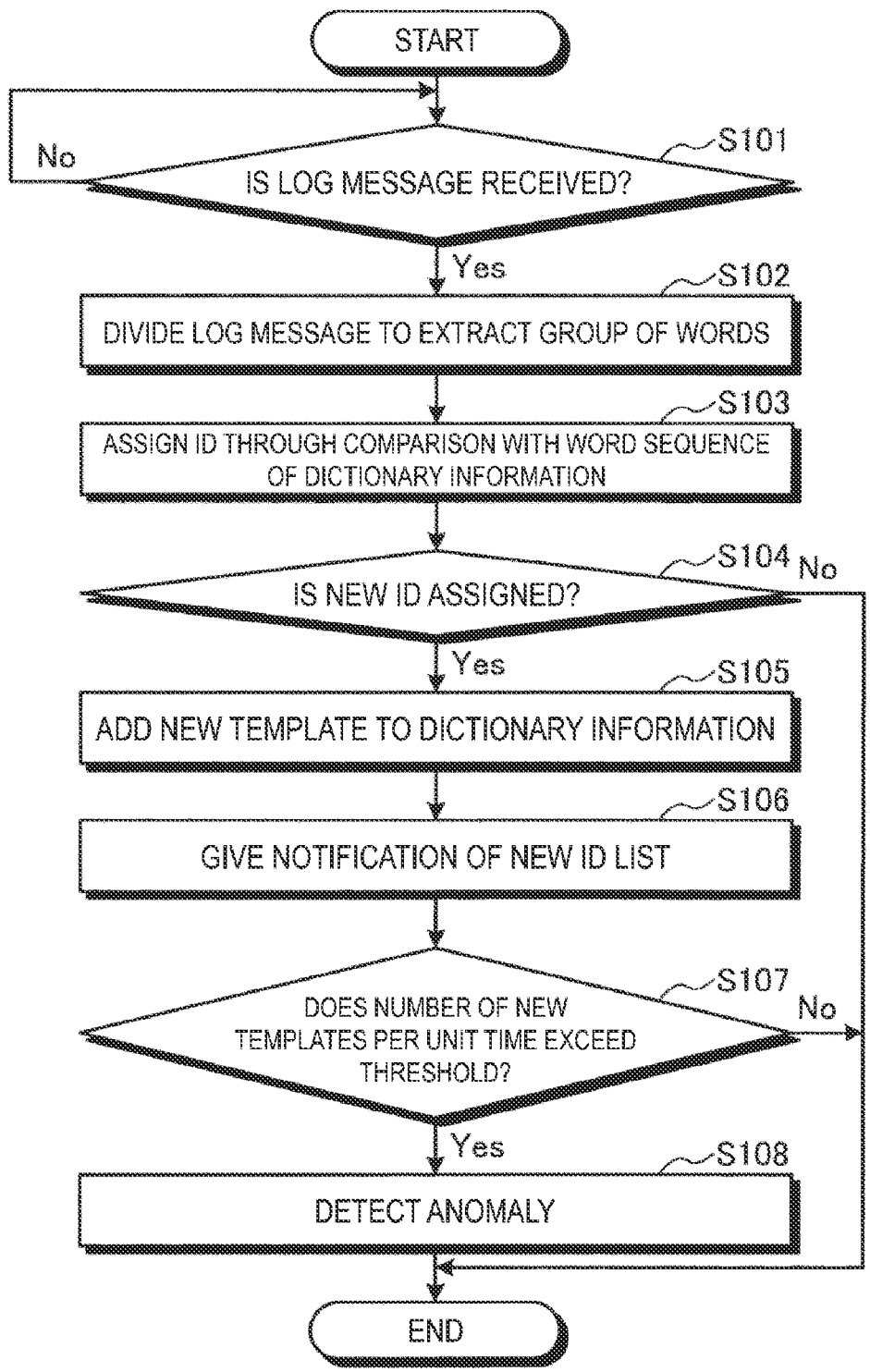
FIG. 11 is a flowchart illustrating an example of a flow of processing in the anomaly detection apparatus according to the first embodiment.

Next, an example of a processing procedure performed by the anomaly detection apparatus 10 according to the first embodiment will be described with reference to FIG. 11. FIG. 11 is a sequence diagram illustrating an example of a flow of processing in the anomaly detection apparatus 10 according to the first embodiment. Note that in the example in FIG. 11, a processing example in which a new ID list is notified each time a new ID is assigned, and an anomaly is detected will be described. However, the timing at which the processing for giving a notification of a new ID list or the processing for detecting an anomaly is performed is not limited to that described above, and may be any timing.

As illustrated in FIG. 11, when the classification unit 15a of the anomaly detection apparatus 10 receives a log message (Yes in step S101), the classification unit 15a divides the message by a predetermined delimiter and extracts a group of words (step S102). Then, the division unit 15a classifies each word into a parameter or a non-parameter according to a character type, compares each word sequence of a group of templates of the dictionary information stored in the storage unit 14 with each of the classified words, and when there is a template for which the word sequence matches all the words in a portion classified as the non-parameter in the message, the classification unit 15a assigns an ID of the template to the message (step S103).

Then, the classification unit 15a determines whether a new ID has been assigned in step S103 (step S104). As a result, if it is not determined that a new ID has been assigned (No in step S104), the classification unit 15a ends the process as is. In addition, if it is determined that a new 1D has been assigned (Yes in step S104), the classification unit 15a adds a new template to the dictionary information 14b of the storage unit 14 (step S105).

Subsequently, the notification unit 15c gives a notification of the new ID list (step S106). Then, the detection unit 15b determines whether the number of new templates per unit time exceeds a threshold (step S107). As a result, if the number of new templates per unit time does not exceed the predetermined number (No in step S107), the detection unit 15b ends the process as is. Further, if the number of new templates per unit time exceeds the predetermined number (Yes in step S107), the detection unit 15b detects an anomaly (step S108).

Effect of First Embodiment

The anomaly detection apparatus 10 according to the first embodiment includes the storage unit 14 that stores dictionary information 14b in which messages included in a text log output from a system in the past and IDs set for corresponding types of messages are associated with each other. When messages included in the text log output from the system are acquired, the anomaly detection apparatus 10 refers to the dictionary information 14b stored in the storage unit 14, and classifies the messages included in the text log by type. Further, the anomaly detection apparatus 10 assigns an ID to each of the classified messages, and detects an anomaly based on the ID assigned to the message. Thus, the anomaly detection apparatus 10 can detect an unknown anomaly.

In addition, the anomaly detection apparatus 10 according to the first embodiment detects an anomaly when the number of new IDs assigned in a predetermined period of time exceeds a predetermined threshold among the IDs assigned to messages. Thus, the anomaly detection apparatus 10 according to the first embodiment can detect an unknown anomaly early by monitoring the number of new IDs assigned per unit time.

In addition, with the anomaly detection apparatus 10 according to the first embodiment, a user can constantly monitor a change in the number of new IDs for each time, for example, by giving a notification of information regarding messages including IDs.

In addition, the anomaly detection apparatus 10 according to the first embodiment aggregates, for each ID, a frequency at which the ID is assigned to a message per unit time, compares the frequency per any unit time with a frequency per another unit time, and detects the level of anomaly for each ID per each unit time. Thus, the anomaly detection apparatus 10 according to the first embodiment can detect an anomaly even for a log of an ID that have been observed in the past.

Further, in the anomaly detection apparatus 10 according to the first embodiment, the classification unit 15a divides a message by a predetermined delimiter to extract a group of words, and classifies each word into a parameter or a non-parameter according to a character type. Further, the anomaly detection apparatus 10 according to the first embodiment compares each word sequence of a group of templates in the dictionary information stored in the storage unit 14 with each of the classified words, and when there is a template for which the word sequence matches all the words in a portion classified as a non-parameter in the message, the anomaly detection apparatus 10 assigns the ID of the template to the message. Thereby, it is possible to classify log messages of the system without making detailed settings in advance regarding the classification method.

System Configuration

Further, the respective components of the devices, which have been illustrated, are functional and conceptual ones, and are not necessarily physically configured as illustrated. That is, the specific form of distribution and integration of the respective devices is not limited to the illustrated one, and all or a portion thereof can be configured to be functionally or physically distributed and integrated in any units, according to various loads, use situations, and the like. Further, all or some of processing functions performed by each device may be realized by a CPU and a program that is analyzed and executed by the CPU, or may be realized as hardware based on a wired logic.

Further, among the processing described in the present embodiment, all or some of the processing described as being automatically performed can alternatively be manually performed, or all or some of the processing described as being manually performed can alternatively be automatically performed by a known method. In addition, information including the processing procedures, control procedures, specific names, and various types of data or parameters illustrated in the aforementioned literature or drawings can be arbitrarily changed unless otherwise specified.

Program

A program in which the processing executed by the anomaly detection apparatus described in the above-described embodiment is described in a computer-executable language can also be created. For example, it is also possible to create an anomaly detection program in which processing executed by the anomaly detection apparatus 10 according to the embodiment is described in a computer-executable language. In this case, when the computer executes the anomaly detection program, the same effects as those of the above-described embodiment can be obtained. Further, the same processing as in the above embodiment may be implemented by recording the anomaly detection program in a computer-readable recording medium, causing a computer to read the anomaly detection program recorded in the recording medium, and executing the program.

Figure 12:
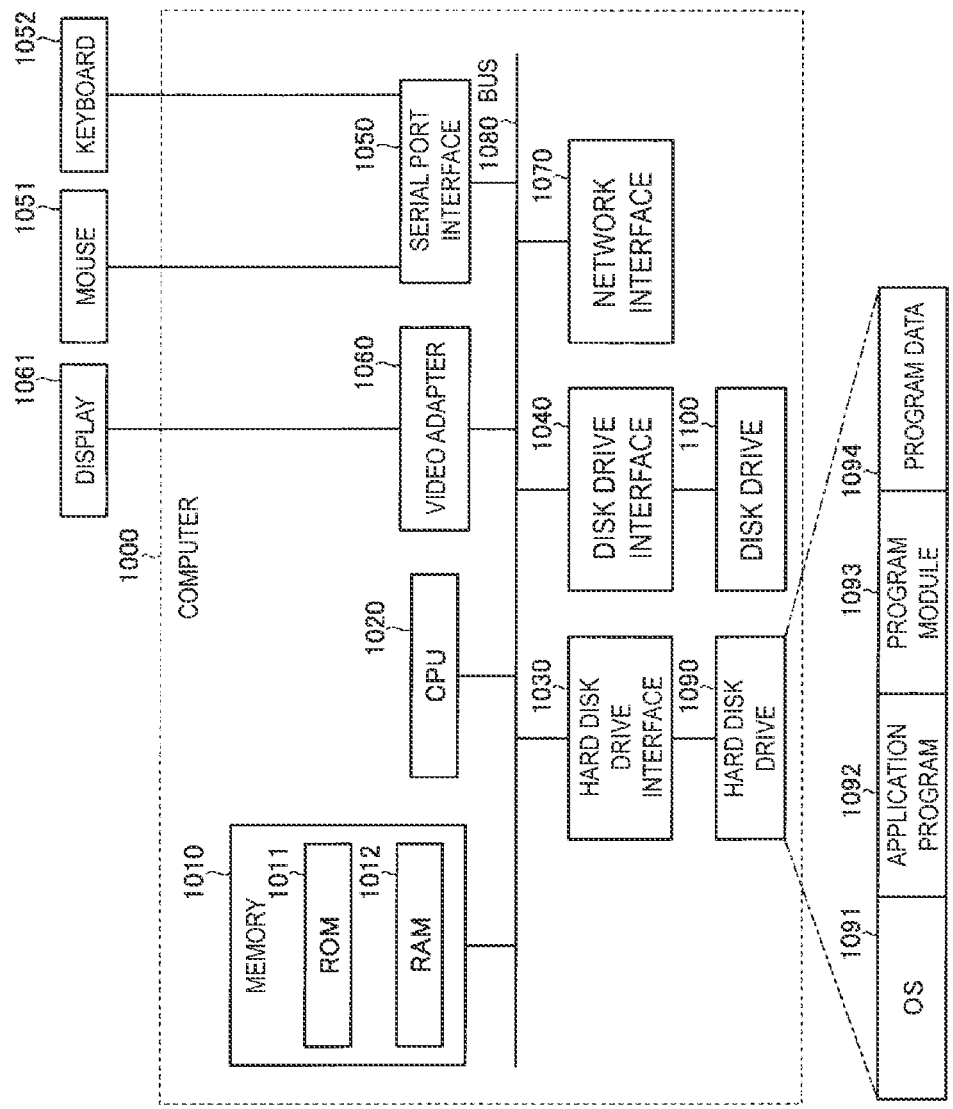
FIG. 12 is a diagram illustrating a computer that executes an anomaly detection program.

FIG. 12 is a diagram illustrating a computer that executes an anomaly detection program. As illustrated in FIG. 12, a computer 1000 includes, for example, a memory 1010, a CPU 1020, a hard disk drive interface 1030, a disk drive interface 1040, a serial port interface 1050, a video adapter 1060, and a network interface 1070, and each of these units is connected by a bus 1080.

The memory 1010 includes a read only memory (ROM) 1011 and a RAM 1012, as illustrated in FIG. 12. The ROM 1011 stores, for example, a boot program such as a basic input output system (BIOS). The hard disk drive interface 1030 is connected to a hard disk drive 1090, as illustrated in FIG. 12. The disk drive interface 1040 is connected to a disk drive 1100, as illustrated in FIG. 12. A detachable storage medium such as a magnetic disk or optical disc, for example, is inserted into the disk drive 1100. The serial port interface 1050 is connected to, for example, a mouse 1110 and a keyboard 1120, as illustrated in FIG. 12. The video adapter 1060 is connected to a display 1130, for example, as illustrated in FIG. 12.

Here, as illustrated in FIG. 12, the hard disk drive 1090 stores, for example, an OS 1091, an application program 1092, a program module 1093, and program data 1094. That is, the above-described anomaly detection program is stored in the hard disk drive 1090, for example, as the program module in which commands to be executed by the computer 1000 have been described.

Further, the various data described in the above embodiment is stored as program data in, for example, the memory 1010 or the hard disk drive 1090. The CPU 1020 reads the program module 1093 or the program data 1094 stored in the memory 1010 or the hard disk drive 1090 into the RAM 1012 as necessary, and executes various processing procedures.

The program module 1093 or the program data 1094 related to the anomaly detection program is not limited to being stored in the hard disk drive 1090. For example, the program module 1093 or the program data 1094 may be stored on a detachable storage medium and read by the CPU 1020 via a disk drive or the like. Alternatively, the program module 1093 or the program data 1094 related to the anomaly detection program may be stored in another computer connected via a network such as local area network (LAN) or a wide area network (WAN) and be read by the CPU 1020 through the network interface 1070.

REFERENCE SIGNS LIST

10 Anomaly detection apparatus
11 Input unit
12 Output unit
13 Communication unit
14 Storage unit
14a Output log information
14b Dictionary information
15 Control unit
15a Classification unit
15b Detection unit
15c Notification unit

The invention claimed is:

1. An anomaly detection apparatus comprising a processor configured to execute a method comprising:
  storing dictionary information in which a partial character string of a message identifies a message type included in a text log output from a system and an identification set for the message type;
  when a current message is acquired from the text log output from the system:
    referring to the dictionary information stored in the store;

determining if the current message is one of the message types in the dictionary information;
when the determining does not find any message type corresponding to the current message:
storing a new message type with a new identification based on the current message in the dictionary information; and
assigning the new message type as the message type for the current message; and
aggregating a frequency at which the new message type is assigned to one or more current messages per unit time; and
determining a level of anomaly for the new message type based on a relative change in frequency of assignment for the new message type from a first predetermined period of time to a second predetermined period of time.

2. The anomaly detection apparatus according to claim 1, further comprises detecting the anomaly when, among a plurality of messages, the number of message types assigned for a corresponding new message type during a predetermined period of time exceeds a predetermined threshold.

3. The anomaly detection apparatus according to claim 1, the processor further configured to execute a method comprising:
dividing the current message by a predetermined delimiter, extract a group of words, and classify each word into a parameter or a non-parameter according to a character type;
assigning, when there is a message type that matches the word in a portion classified as the non-parameter in a group of message types in the dictionary information stored in the store, an identification corresponding to the message type to the current message; and
assigning, when there is no message type that matches the word in the portion classified as the non-parameter in the group of types in the dictionary information, a new message type to the message.

4. The anomaly detection apparatus according to claim 1, the processor further configured to execute a method comprising:
notifying information regarding the new message type including the identification.

5. A computer implemented method for detecting anomaly, the method comprising:
storing dictionary information, wherein the dictionary information includes a character string of a message identifying a message type in a text log output and a set of identifications for the message type;
when a current message is acquired from included in the text log output from the system:
referring to the dictionary information stored in the store;
determining if the current message is one of the message types in the dictionary information;
when the determining does not find any message type corresponding to the current message:
storing a new message type with a new identification based on the current message in the dictionary information; and
assigning the new message type as the message type for the current message; and
aggregating a frequency at which the new message type is assigned to one or more current messages per unit time; and
determining a level of anomaly for the new message type based on a relative change in frequency of assignment for the new message type from a first predetermined period of time to a second predetermined period of time.

6. A computer-readable non-transitory recording medium storing a computer-executable program for anomaly detection that when executed by a processor cause the computer-executable program to execute a method comprising:
when a current message is acquired from the text log output from the system;
determining if the current message is one of the message types in the dictionary information;
when the determining does not find any message type corresponding to the current message:
storing a new message type with a new identification based on the current message in the dictionary information; and
assigning the new message type as the message type for the current message; and
aggregating a frequency at which the new message type is assigned to one or more current messages per unit time; and
determining a level of anomaly for the new message type based on a relative change in frequency of assignment for the new message type from a first predetermined period of time to a second predetermined period of time.

7. The anomaly detection apparatus according to claim 2, further comprises:
dividing the current message by a predetermined delimiter, extract a group of words, and classify each word into a parameter or a non-parameter according to a character type;
assigning, when there is a message type that matches the word in a portion classified as the non-parameter in a group of message types in the dictionary information stored in the store, an identification corresponding to the message type to the current message; and
assigning, when there is no message type that matches the word in the portion classified as the non-parameter in the group of types in the dictionary information, a new message type to the message.

8. The anomaly detection apparatus according to claim 2, the processor further configured to execute a method comprising:
notifying information regarding the new message type including the identification.

9. The anomaly detection apparatus according to claim 1, further comprises:
dividing the current message by a predetermined delimiter,
extracting a group of words,
classifying each word into a parameter or a non-parameter according to a character type,
assigning, when there is a message type that matches the word in a portion classified as the non-parameter in a group of message types in the dictionary information stored in the store, an identification corresponding to the message type to the current message; and
assigning, when there is no message type that matches the word in the portion classified as the non-parameter in the group of types in the dictionary information, a new message type to the message.

10. The anomaly detection apparatus according to claim 1, the processor further configured to execute a method comprising:

notifying information regarding the new message type including the identification.

11. The anomaly detection apparatus according to claim 3, the processor further configured to execute a method comprising:
   notifying information regarding the new message type including the identification.

12. The computer implemented method according to claim 5, further comprises:
   detecting the anomaly when, among a plurality of messages, the number of message types assigned for a corresponding new message type during a predetermined period of time exceeds a predetermined threshold.

13. The computer implemented method according to claim 5, further comprises:
   dividing the current message by a predetermined delimiter,
   extracting a group of words,
   classifying each word into a parameter or a non-parameter according to a character type,
   assigning, when there is a message type that matches the word in a portion classified as the non-parameter in a group of message types in the dictionary information stored in the store,
   an identification corresponding to the message type to the current message; and
   assigning, when there is no message type that matches the word in the portion classified as the non-parameter in the group of types in the dictionary information, a new message type to the message.

14. The computer implemented method according to claim 5, the method further comprising:
   notifying information regarding the new message type including the identification.

15. The computer implemented method according to claim 12, further comprises:
   dividing the current message by a predetermined delimiter,
   extracting a group of words,
   classifying each word into a parameter or a non-parameter according to a character type,
   assigning, when there is a message type that matches the word in a portion classified as the non-parameter in a group of message types in the dictionary information stored in the store, an identification corresponding to the message type to the current message; and
   assigning, when there is no message type that matches the word in the portion classified as the non-parameter in the group of types in the dictionary information, a new message type to the message.

16. The computer implemented method according to claim 12, the method further comprising:
   notifying information regarding the new message type including the identification.

17. The computer implemented method according to claim 5, further comprises:
   dividing the current message by a predetermined delimiter,
   extracting a group of words,
   classifying each word into a parameter or a non-parameter according to a character type,
   assigning, when there is a message type that matches the word in a portion classified as the non-parameter in a group of message types in the dictionary information stored in the store, an identification corresponding to the message type to the current message; and
   assigning, when there is no message type that matches the word in the portion classified as the non-parameter in the group of types in the dictionary information, a new message type to the message.

18. The computer implemented method according to claim 5, the method further comprising:
   notifying information regarding the new message type including the identification.

* * * * *